(12) United States Patent
Witte

(10) Patent No.: US 10,571,020 B2
(45) Date of Patent: Feb. 25, 2020

(54) HYDROSTATIC TRANSMISSION AND METHOD FOR BRAKING USING THE SAME

(71) Applicant: Robert Bosch GmbH, Stuttgart (DE)

(72) Inventor: Heiko Witte, Ulm (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/894,790

(22) Filed: Feb. 12, 2018

(65) Prior Publication Data
US 2018/0231121 A1    Aug. 16, 2018

(30) Foreign Application Priority Data

Feb. 14, 2017    (DE) ..................... 10 2017 202 273

(51) Int. Cl.
| | |
|---|---|
| *F16H 61/44* | (2006.01) |
| *F16H 61/4157* | (2010.01) |
| *F16H 39/00* | (2006.01) |
| *F16H 61/435* | (2010.01) |
| *F16H 61/4017* | (2010.01) |
| *F16H 61/42* | (2010.01) |
| *F16H 61/431* | (2010.01) |
| *F16H 59/44* | (2006.01) |
| *F16H 59/36* | (2006.01) |
| *F16H 59/40* | (2006.01) |

(52) U.S. Cl.
CPC ......... *F16H 61/4157* (2013.01); *F16H 39/00* (2013.01); *F16H 61/4017* (2013.01); *F16H 61/42* (2013.01); *F16H 61/431* (2013.01); *F16H 61/435* (2013.01); *F16H 59/40* (2013.01); *F16H 59/44* (2013.01); *F16H 2059/366* (2013.01)

(58) Field of Classification Search
CPC .... F16H 61/42; F16H 61/435; F16H 61/4157; F16H 61/431; F16H 61/4017; F16H 39/00
See application file for complete search history.

(56) References Cited

U.S. PATENT DOCUMENTS

| | | | |
|---|---|---|---|
| 8,683,794 B2 * | 4/2014 | Fukuda | F16H 61/4008 60/431 |
| 9,303,633 B2 * | 4/2016 | Maiyur | F04B 13/00 |
| 2017/0072935 A1 * | 3/2017 | Ornella | B60K 6/12 |

FOREIGN PATENT DOCUMENTS

| | | |
|---|---|---|
| DE | 10 2014 211 393 A1 | 12/2014 |
| DE | 10 2014 211 394 A1 | 12/2014 |
| EP | 1 960 699 B1 | 5/2011 |

* cited by examiner

*Primary Examiner* — Abiy Teka
(74) *Attorney, Agent, or Firm* — Maginot, Moore & Beck LLP

(57) ABSTRACT

A hydrostatic transmission with which a braking operation is realized in which at least one traction motor which acts as a pump is supported via a closed circuit on an adjustable axial piston pump which acts as a motor, and which in turn is supported on an internal combustion engine. Since overspeeding of the latter should be avoided, pilot control is performed with a rotational speed that is subcritical for the internal combustion engine, and thereafter closed-loop control is performed with a closed-loop controller which outputs a corrective value in a manner dependent on the rotational speed deviation between the present rotational speed and the maximum and thus ideal rotational speed of the internal combustion engine.

17 Claims, 4 Drawing Sheets

HYDROSTATIC TRANSMISSION AND METHOD FOR BRAKING USING THE SAME

This application claims priority under 35 U.S.C. § 119 to patent application no. DE 10 2017 202 273.6, filed on Feb. 14, 2017 in Germany, the disclosure of which is incorporated herein by reference in its entirety.

The disclosure relates to a hydrostatic transmission with which a hydrostatic braking operation is possible, and to a method for braking with a hydrostatic transmission of said type.

BACKGROUND

The prior art has disclosed hydrostatic transmissions for mobile working machines in which a hydrostatic pump (primary unit) and a hydrostatic motor (secondary unit) are fluidically connected to one another by means of a closed circuit. An internal combustion engine, for example a diesel engine of the mobile working machine, is coupled rotationally conjointly to the primary unit, and an output, for example an axle or a wheel of the mobile working machine, is coupled rotationally conjointly to the secondary unit. The mobile working machine thus has a traction drive which has a hydrostatic transmission.

The document EP 1 960 699 B1 discloses a hydrostatic transmission of said type, with which braking can also be performed. Here, in relation to traction operation, the power flows in the reversed direction from the output, via the secondary unit acting as a pump and via the primary unit acting as a motor, to the internal combustion engine, which is then driven in a passive cranking operating mode. The highly pressurized working line of the closed circuit is in this case safeguarded by means of a pressure-limiting valve, by means of which, too, a part of the braking power can be dissipated during the braking operation.

A problem during such braking operations is that the internal combustion engine may be driven only with a maximum rotational speed in order that it is not destroyed. Therefore, the primary unit, which is designed as an adjustable axial piston machine and which operates as a motor is, during the braking operation, permanently set to a pivot angle at which a torque is generated that can still be supported by the internal combustion engine without the latter being caused to overspeed. This occurs taking into consideration the pressure determined in the working line by the setting of the pressure-limiting valve.

A disadvantage of the hydrostatic transmissions of the prior art is that, during the braking function, the internal combustion engine is not brought to its maximum rotational speed. It is therefore disadvantageously necessary for a considerable part of the braking power to be dissipated by means of the pressure-limiting valve of the high-pressure line in question.

The documents DE 10 2014 211 393 A1 and DE 10 2014 211 394 A1 each likewise disclose a hydrostatic transmission with which braking can also be performed, wherein it is sought to protect the internal combustion engine against overspeeding. A first part of the braking power is output via the primary unit to the internal combustion engine, whereas a second part of the braking power is converted by means of the pressure-limiting valve of the high-pressure line in question into heat. Here, a rotational speed of the internal combustion engine which is initially slightly higher than the admissible rotational speed limit is accepted.

SUMMARY

By contrast to this, the disclosure is based on the object of providing a hydrostatic transmission and a method, in which the pivot angle and thus the swept volume (during braking operation, this is a displacement volume) of the primary unit are optimally controlled, or controlled in closed-loop fashion, such that the rotational speed of the internal combustion engine is brought to its maximum rotational speed as quickly as possible and is held as close as possible to this maximum rotational speed. Here, the internal combustion engine should not exceed its maximum rotational speed at any time.

Said object is achieved, as disclosed herein

The claimed hydrostatic transmission is provided for a traction drive which has an internal combustion engine, for example a diesel engine, and an output, for example a wheel or an axle. The hydrostatic transmission has a driveshaft, which is couplable to the internal combustion engine of the traction drive, of a primary unit, which during traction operation operates as a pump, and has a secondary unit, which is couplable to the output of the traction drive, or multiple secondary units connected hydraulically in parallel, which during traction operation operate as motor(s). Both units are fluidically connected to one another by means of two working lines of a closed circuit. The hydrostatic transmission furthermore has an electrical control unit by means of which a braking operation can be controlled or controlled in closed loop fashion, in which braking operation a braking torque of the secondary unit which acts as a pump is supported by means of the primary unit which acts as a motor, on the driveshaft of said primary unit. With regard to the traction drive as a whole, the braking torque of the output is thus supported on the internal combustion engine via the two units. According to the disclosure, a pilot-controlled pivot angle or a pilot-controlled swept volume for the primary unit is predefined by the control unit, which lies below a maximum rotational speed of the internal combustion engine, such that the latter reliably does not overspeed at the start of the braking operation. Then, by means of a closed-loop controller, a corrective value is calculated and output, which is added to the pilot-controlled pivot angle or the pilot-controlled swept volume. Thus, the pivot angle and the swept volume are increased from a range which is subcritical for the internal combustion engine, such that the internal combustion engine is brought from the subcritical range to its maximum rotational speed such that the braking power flowing via the primary unit to the internal combustion engine is maximized, without the internal combustion engine overspeeding in the process.

With regard to the hydrostatic transmission according to the disclosure, which does not comprise the internal combustion engine, the rotational speed, which is to be limited, of the crankshaft of the internal combustion engine can be transmitted to the control unit via a signal input of the latter or can be picked off directly at the driveshaft of the primary unit, if the crankshaft and the driveshaft are in one piece, or else can be mathematically determined from a rotational speed of the driveshaft of the primary unit, if a mechanical transmission stage is provided between the crankshaft and the driveshaft.

In a particularly preferred refinement, the closed-loop controller has, as an input variable, a rotational speed difference between, on the one hand, an actual rotational speed of the internal combustion engine or a variable derived from the former, in particular the actual rotational speed of the primary unit, and, on the other hand, a maximum rotational speed of the internal combustion engine or a variable correspondingly derived from the former.

The closed-loop controller is preferably a P or PI closed-loop controller. The control unit preferably has the closed-loop controller.

To be able to utilize the hydrostatic transmission according to the disclosure in different situations in which the internal combustion engine, according to the prior art, could overspeed at least in transition situations, the control unit may be refined such that a braking operation is initiated either by means of an operating element, for example brake pedal, in particular via an input for a signal line of the operating element, or on the basis of automatic monitoring of the traveling speed of the mobile working machine, in particular an input for a signal of a speed sensor, or of a variable derived from the former, such as for example the rotational speed of the secondary unit, or on the basis of automatic monitoring of the rotational speed of the internal combustion engine or of the variable derived from the former.

The secondary unit is preferably also formed with an adjustable swept volume. This may be adjusted for example in a manner dependent on the operating element.

To permit a high-power braking operation, it is preferable if in each case one pressure-limiting valve is arranged on both working lines. A first part of the braking power can be dissipated via the related pressure-limiting valve, whereas a second part of the braking power can be dissipated via the primary unit and via the internal combustion engine. The braking power that can be realized is particularly high if the first part is greater than the second part.

If, during the high-power braking operation, the volume flow via the primary unit increases, the volume flow via the related pressure-limiting valve decreases. Thus, the pressure in the highly pressurized working line can fall. To minimize this pressure reduction or to keep the pressure approximately constant, pressure-limiting valves are preferred which have a flat characteristic curve with regard to their pressure difference as a function of their passed-through volume flow.

In a preferred refinement of the hydrostatic transmission according to the disclosure, the pivot angle and the swept volume of the primary unit are adjustable in both directions from a zero position. The traction drive in question can thus, with a constant direction of rotation of the internal combustion engine, be utilized in traction operation in both directions of travel of the mobile working machine, and can correspondingly be braked according to the disclosure in both directions.

In a first exemplary embodiment of the hydrostatic transmission according to the disclosure, a load-sensing axial piston machine is used as primary unit, the drive mechanism of which is, during pump operation, acted on by forces in the direction of a decrease of its pivot angle, which forces are dependent on a pressure difference between the two working lines and a rotational speed of the driveshaft and the pivot angle of the primary unit. Then, in the control unit, there is stored a characteristic map of the primary unit in which various pressure differences and various rotational speeds are assigned a respective pivot angle or a respective swept volume. Based on the consideration of the characteristic map, no feedback of the pivot angle of the primary unit is required. Thus, rather than primary units with closed-loop position control, such as can be found for example in agricultural machines, use is made of load-sensing primary units, which are normally somewhat less expensive.

It is particularly preferable if the control unit, by means of an electrical setting pressure valve and a setting cylinder of an adjustment device of the primary unit, can control a setting pressure in the direction of an increase of the pivot angle of said primary unit and thus of the swept volume of said primary unit. Here, the dependency of said setting pressure or of a setting pressure deviation on the pressure difference between the two working lines and on the rotational speed of the driveshaft and on the pivot angle or on the swept volume of the primary unit is stored in the characteristic map.

In a refinement which is simple in terms of apparatus, the setting cylinder is of single-acting design so as to act counter to a spring, such that the setting pressure acts only in the direction of an increase of the pivot angle and of the swept volume, whereas the spring acts in the direction of a decrease of the pivot angle and of the swept volume.

In the case of a double-acting setting cylinder, the two setting pressure chambers of which can be charged with the setting pressure or with the setting pressure deviation via the common or a respective electrically adjustable setting pressure valve, the traction drive in question can, with a constant direction of rotation of the internal combustion engine, be utilized in traction operation in both directions of travel of the mobile working machine, and correspondingly braked according to the disclosure in both directions. Here, a double-acting spring arrangement is provided which acts in the direction of a central position in which the pivot angle and the swept volume are zero.

Then, the pressure differences of the two working lines and the rotational speeds of the driveshaft for the pivot angles and swept volumes in both directions from the zero position are correspondingly stored in the characteristic map.

The characteristic map is preferably assigned, or has superimposed thereon, a safety corrective value of the swept volume or of the pivot angle, which safety corrective value gives rise to a reduction of the pivot angle or of the swept volume or is subtracted from the pivot angle or the swept volume. In particular, the safety corrective value can be incorporated into the characteristic map. This serves for the compensation of inaccuracies of the characteristic map in particular owing to variance (manufacturing inaccuracies) of the primary unit. Owing to the safety corrective value, the pilot-controlled pivot angle or the pilot-controlled swept volume is so small that the actual rotational speed of the internal combustion engine always remains below its maximum rotational speed, such that the internal combustion engine reliably does not overspeed at the start of the braking operation. Directly thereafter, by means of the closed-loop controller according to the disclosure, the actual rotational speed is quickly and accurately approximated to the maximum rotational speed of the internal combustion engine.

In the first exemplary embodiment of the hydrostatic transmission according to the disclosure with the load-sensing primary unit, it is for example possible for an electrically directly controlled adjustment device to be provided, in which a setting pressure in a setting cylinder is predefined by an electrically adjustable pressure-reducing valve (EV adjustment with a single pressure-reducing valve and a directional valve or ET adjustment with two electrically adjustable pressure-reducing valves), or for a hydraulic rotational-speed-dependent adjustment device to be provided, in which a setting pressure in a setting cylinder is predefined by means of a closed-loop control valve which is adjustable in rotation-speed-dependent fashion (DA adjustment).

In a second exemplary embodiment of the hydrostatic transmission according to the disclosure, the pivot angle of the primary unit is adjustable by means of an adjustment device which exhibits feedback of the pivot angle. The adjustment device may be an electroproportional (EP) adjustment device, in which the swept volume is proportional to an electrical current that flows through a proportional electromagnet that actuates a closed-loop control valve.

The method according to the disclosure for the control or closed-loop control of a braking operation with an above-described hydrostatic transmission has the steps:

pivoting the primary unit back to a small pivot angle or a small swept volume, for example to approximately 10% of the maximum pivot angle or of the maximum swept volume, performing pilot control of the pivot angle or of the swept volume, and performing closed-loop control of the pivot angle or of the swept volume, wherein a corrective value is added to a pilot-controlled pivot angle or to a pilot-controlled swept volume.

The two former steps may be performed in the stated sequence, whereby overspeeding of the internal combustion engine is prevented with the greatest possible reliability. The two former steps may be performed simultaneously, whereby time is saved and the braking operation can be initiated quickly.

In a particularly preferred refinement of the method, the closed-loop control is performed through determination of a corresponding corrective value in a manner dependent on a rotational speed difference between, on the one hand, an actual rotational speed of the internal combustion engine, or of a variable derived from the former, in particular the actual rotational speed of the primary unit, and, on the other hand, a maximum rotational speed of the internal combustion engine, or a variable correspondingly derived from the former.

In a preferred refinement of the method according to the disclosure, advance initiation of the braking operation is performed by means of a driver demand or on the basis of an overshooting of the rotational speed of the internal combustion engine or of the variable derived from the former (actual rotational speed exceeds a maximum admissible rotational speed) or on the basis of an overshooting of a traveling speed or of a variable derived therefrom, in particular of the rotational speed of the secondary unit (traveling speed exceeds a desired or maximum admissible traveling speed).

During the braking operation according to the disclosure with the hydrostatic transmission, it is possible, according to the first exemplary embodiment, for the pilot control of the pivot angle or of the swept volume to be performed on the basis of the characteristic map.

Two exemplary embodiments of the hydrostatic transmission according to the disclosure and of a drive according to the disclosure are illustrated in the drawings. The disclosure will now be discussed in more detail on the basis of the figures of said drawings.

DETAILED DESCRIPTION

Figure 1:
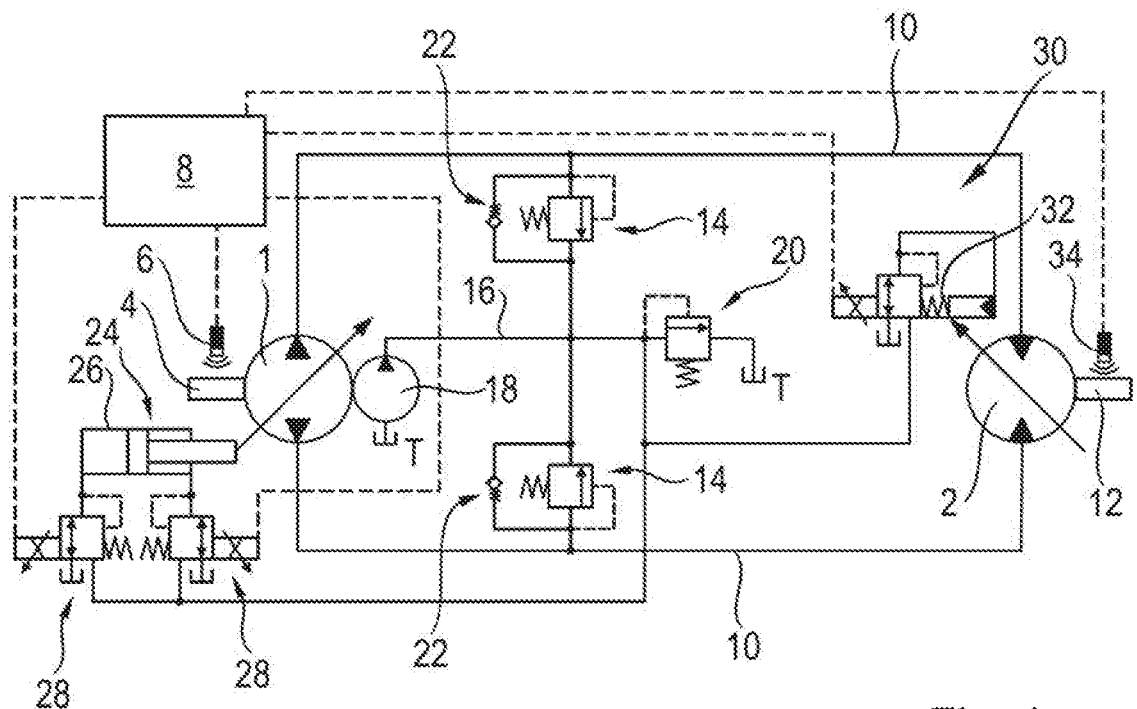
FIG. 1 shows a circuit diagram of the hydrostatic transmission according to the disclosure as per a first exemplary embodiment.

FIG. 1 shows a circuit diagram of the hydrostatic transmission according to the disclosure. Said transmission has a primary unit 1 and a secondary unit 2, which are both designed with an adjustable swept volume. The primary unit 1 is an axial piston machine, to the driveshaft 4 of which there is rotationally conjointly connected a crankshaft of a diesel engine (not shown). The rotational speed of the driveshaft 4 is monitored by means of a rotational speed sensor 6 and an electrical control unit 8. The rotational speed of the crankshaft of the diesel engine is thus also indirectly monitored.

The primary unit 1 is fluidically connected to the secondary unit 2 via a closed hydraulic circuit, which has two working lines 10. An output (not shown) is rotationally conjointly coupled to a driveshaft 12 of the secondary unit 2. The output is for example a differential transmission of a driven axle of the mobile working machine.

The hydrostatic transmission according to the disclosure as per FIG. 1 thus forms, together with the diesel engine and the output, a traction drive of a mobile working machine. During traction operation, the driveshaft 4 of the primary unit 1 serves as a driveshaft, and the primary unit 1 operates as a pump, whereas the secondary unit 2 operates as a motor, and the driveshaft 12 of the secondary unit 2 is an output shaft.

During a braking operation of the hydrostatic transmission according to the disclosure, the output is supported, via the driveshaft 12 and via the secondary unit 2 operating as a pump and via one of the two working lines 10 and via the primary unit 1 operating as a motor and via the driveshaft 4 of the primary unit 1, on the diesel engine, which is then cranked and, by means of its friction and acceleration forces of the pistons, dissipates at least a part of the braking energy of the mobile working machine.

On each working line 10 there is provided a pressure-limiting valve 14, via which the respective working line 10 can be relieved of pressure to a feed line 16. The latter is filled with feed pressure medium from a tank T by a feed pump 18, which is coupled rotationally conjointly to the driveshaft 4 of the primary unit 1. Furthermore, the feed line 16 can be relieved of pressure to a tank T via a pressure-limiting valve 20.

The feed line 16 is connected via a respective spring-loaded check valve 22 to the two working lines 10, such that the respectively low-pressure-conducting working line 10 can possibly be supplied with additional pressure medium from the feed line 10. For this purpose, the opening directions of the two check valves 22 are directed from the feed line 16 to the respective working line 10.

The adjustment of the swept volume of the primary unit 1 is realized by means of an adjustment device 24. The latter has a double-acting setting cylinder 26, the two pressure chambers of which act counter to one another on a setting piston which is coupled to a swashplate of the axial piston machine 1.

In the first exemplary embodiment, each of the two pressure chambers can be charged with pressure medium from the feed line 16 via a separate setting pressure valve 28. The two setting pressure valves 28 are electrically adjusted by the control unit 8. Furthermore, the adjustment device 24 has a spring arrangement (not shown) by means of which the piston of the setting cylinder 26 and the swashplate of the primary unit 1 are preloaded into a central position. From there, the primary unit 1 can be adjusted in both directions.

Since the primary unit 1 permits four-quadrant operation in both exemplary embodiments of the hydrostatic transmission according to the disclosure, forward travel and forward braking and reverse travel and reverse braking are thus possible.

In both exemplary embodiments, as already mentioned, the secondary unit 2 is also of adjustable design. For this purpose, use is made of an adjustment device 30 which has a valve with an electrical actuator which is likewise actuated by the control unit 8. Here, the adjustment device 30 has a feedback spring 32, such that closed-loop control of the pivot angle of the secondary unit 2 is possible.

Figure 2:
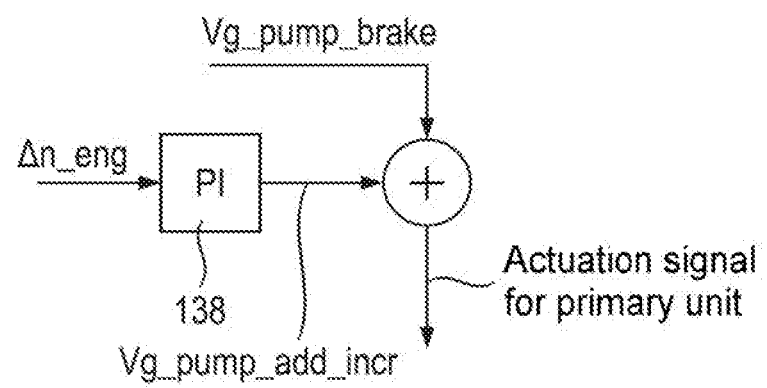
FIG. 2 shows a schematic overview of the pilot control with closed-loop control according to the disclosure of the swept volume of the primary unit during the braking operation as per a second exemplary embodiment.

FIG. 2 shows a schematic overview of the pilot control with closed-loop control according to the disclosure of the swept volume of the primary unit during the braking operation as per the second exemplary embodiment. A rotational speed difference Δn_eng between, on the one hand, the actual rotational speed n_eng_act of the internal combustion engine or the rotational speed, proportional to the former, of the primary unit n_pump_act and, on the other hand, a maximum rotational speed n_eng_max of the internal combustion engine or the rotational speed, proportional to the former, of the primary unit n_pump_max is an input variable of a PI closed-loop controller 138. The latter outputs a corrective value Vg_pump_add_incr for the swept volume Vg_pump. More specifically, the corrective value Vg_pump_add_incr is added to the pilot-controlled swept volume Vg_pump_brake to give an actuation signal for the adjustment device of the primary unit. Thus, according to the disclosure, the diesel engine is brought from a subcritical range to its maximum rotational speed n_eng_max without overshooting the latter.

The adjustment device for the pivot angle of the primary unit as per the second exemplary embodiment exhibits feedback of the pivot angle and may be an electroproportional (EP) adjustment device. The adjustment device may correspond to the adjustment device of the secondary unit of the first exemplary embodiment as per FIG. 1.

Figure 3:
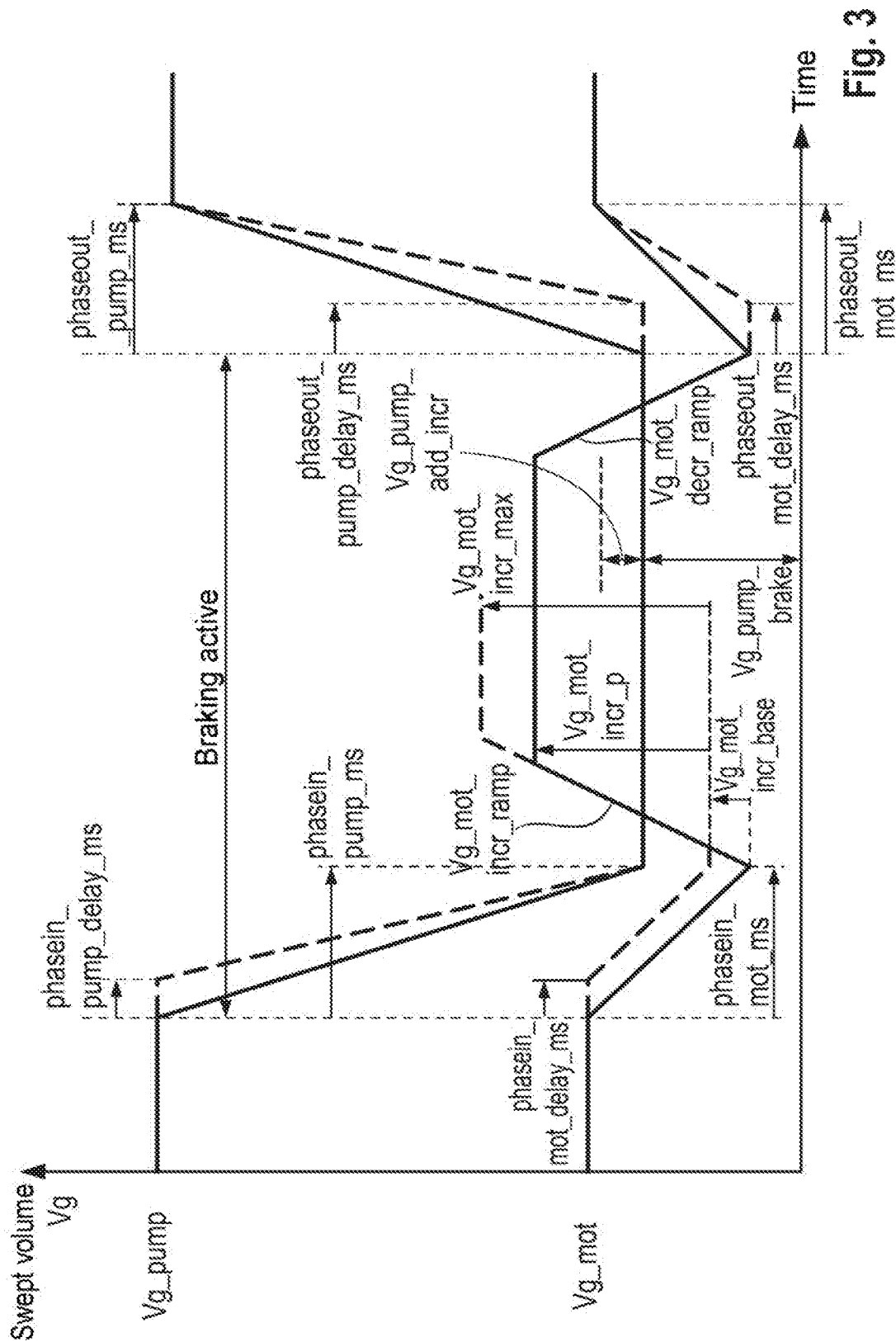
FIG. 3 shows a diagram of the swept volumes of the primary unit and of the secondary unit of the hydrostatic transmission during the braking operation as per both exemplary embodiments.

FIG. 3 shows, in a diagram, the profile with respect to time of the swept volumes Vg_pump, Vg_mot of the primary unit 1 and of the secondary unit 2 of the two exemplary embodiments. Firstly a transition from traction operation to braking operation, and then a transition from braking operation back to traction operation, are shown. Such a braking operation by means of the hydrostatic transmission according to the disclosure may be initiated by:

a) transmission of a signal from an operating element actuated by a driver, for example a brake pedal, to the control unit 8,
b) a high, limit-value rotational speed of the diesel engine that has been determined by the rotational speed sensor 6 and by the control unit 8,
c) a limit-value traveling speed v_veh of the mobile working machine that has been determined indirectly by a rotational speed sensor 34 of the driveshaft 12 of the secondary unit 2 and transmitted to the control unit 8.

In both exemplary embodiments, the braking operation is controlled, or controlled in closed-loop fashion, by the control unit 8. For this purpose, firstly, the pivot angle angle_pump and thus the swept volume Vg_pump of the primary unit 1 is reduced in a short time to a low value. Said low value may amount to for example approximately 10% of the maximum pivot angle angle_pump_max or of the maximum swept volume Vg_pump_max of the primary unit 1. Thus, firstly, the diesel engine is reliably protected against an excessively high rotational speed n_eng because said diesel engine, in the short time, not the rotational speed n_eng that would theoretically have to be attained at the small pivot angle angle_pump of the primary unit. Thus, the pressure in the working line 10 that now conducts high pressure increases quickly, and the corresponding high-pressure valve 14 opens a connection to the feed line 16.

In both exemplary embodiments, the control unit 8 thereupon actuates the adjustment device 30 of the secondary unit 2 such that its pivot angle and thus its swept volume Vg_mot are increased. Here, the pivot angle angle_pump of the primary unit 1 is also increased again somewhat (not illustrated), whereby the diesel engine is accelerated and a part of the braking power is dissipated via the latter.

The further abbreviations or formula terms in the diagram of FIG. 3 have the following meaning:

| | |
|---|---|
| phasein_mot_ms | Duration of the activation of the secondary unit. |
| phasein_mot_delay_ms | Delay of the activation of the secondary unit, if it reacts more quickly than the primary unit. |
| phasein_pump_ms | Duration of the activation of the primary unit. |
| phasein_pump_delay_ms | Delay of the activation of the primary unit, if it reacts more quickly than the secondary unit. |
| phaseout_mot_ms | Duration of the deactivation of the secondary unit. |
| phaseout_mot_delay_ms | Delay of the deactivation of the secondary unit, if it reacts more quickly than the primary unit. |
| phaseout_pump_ms | Duration of the deactivation of the primary unit. |
| phaseout_pump_delay_ms | Delay of the deactivation of the primary unit, if it reacts more quickly than the secondary unit. |

To maximize the rotational speed of the diesel engine and to not exceed a permissible maximum rotational speed in the process, the closed-loop control discussed with reference to the following figures is used in the first exemplary embodiment, and the closed-loop control discussed with reference to FIG. 2 is used in the second exemplary embodiment.

Figure 4:
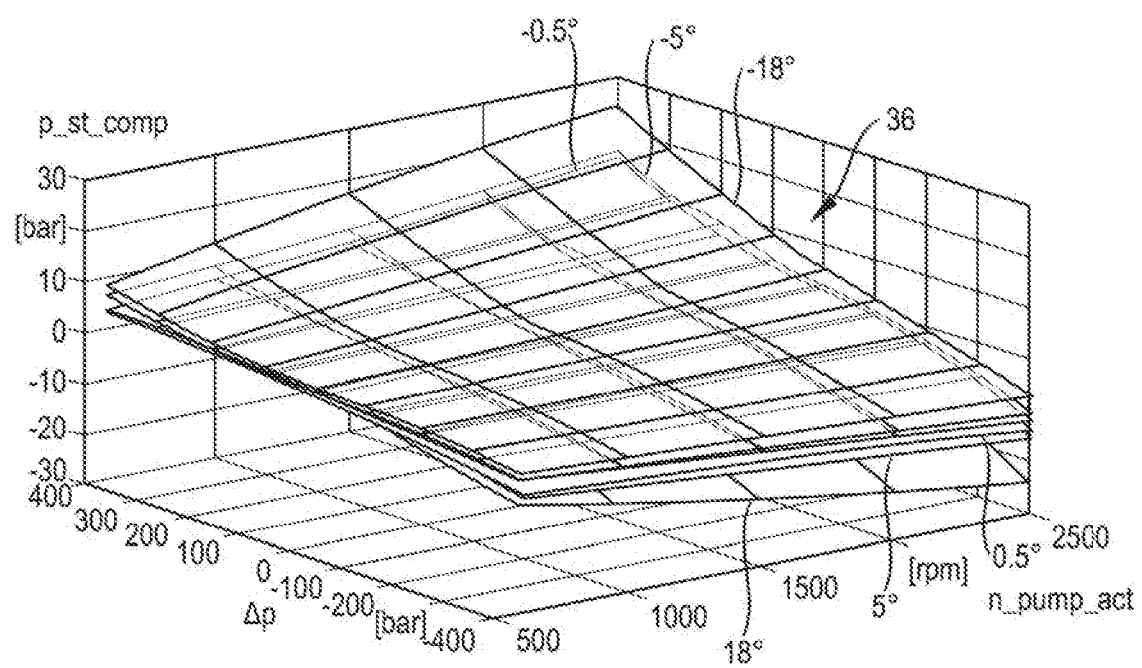
FIG. 4 shows a characteristic map of the primary unit of the hydrostatic transmission as per the first exemplary embodiment.

FIG. 4 shows a characteristic map 36 of the primary unit 1 as per the first exemplary embodiment, which is designed as a load-sensing unit. The characteristic map 36 represents the influence of the pressure difference Δp between the two working lines 10 and of the actual rotational speed n_pump_act and furthermore of the pivot angle angle_pump of the primary unit 1 on the setting pressure p_st prevailing in the setting cylinder 24 (cf. FIG. 1). More specifically, the relationship is illustrated such that the pressure difference Δp of the two working lines 10 is plotted along a first axis, wherein for example the positive pressure differences Δp represent overrun operation and the negative pressure differences Δp represent the braking operation according to the disclosure. The actual rotational speed of the driveshaft 4 n_pump_act of the primary unit 1 is plotted on a further axis. The different surfaces of the surface set shown apply for example for three positive and three negative pivot angles angle_pump of the swashplate of the primary unit 1. Plotted on the vertical axis is a setting pressure deviation p_st_comp that is required for maintaining the pivot angle angle_pump at the respective operating point. Here, positive pressure values in the abovementioned example represent overrun operation, whereas the negative pressure values apply for the braking operation according to the disclosure. This means that, upon the initiation of the braking operation, in the case of the adjustment device 24 discussed with reference to FIG. 1, a change of the pressure chamber that is charged with setting pressure medium p_st is required.

In the first exemplary embodiment, the characteristic map 36 is stored in the control unit 8 (cf. FIG. 1), such that, by means of a pressure sensor (not shown) provided on each of the working lines 10, the control unit 8 can control every desired pivot angle angle_pump by virtue of the corresponding setting pressure deviation p_st_comp being set through corresponding actuation of the setting pressure valves 28. Here, by contrast to the hydrostatic transmissions of the prior art, no feedback of the pivot angle angle_pump of the primary unit 1 is necessary.

Figure 5:
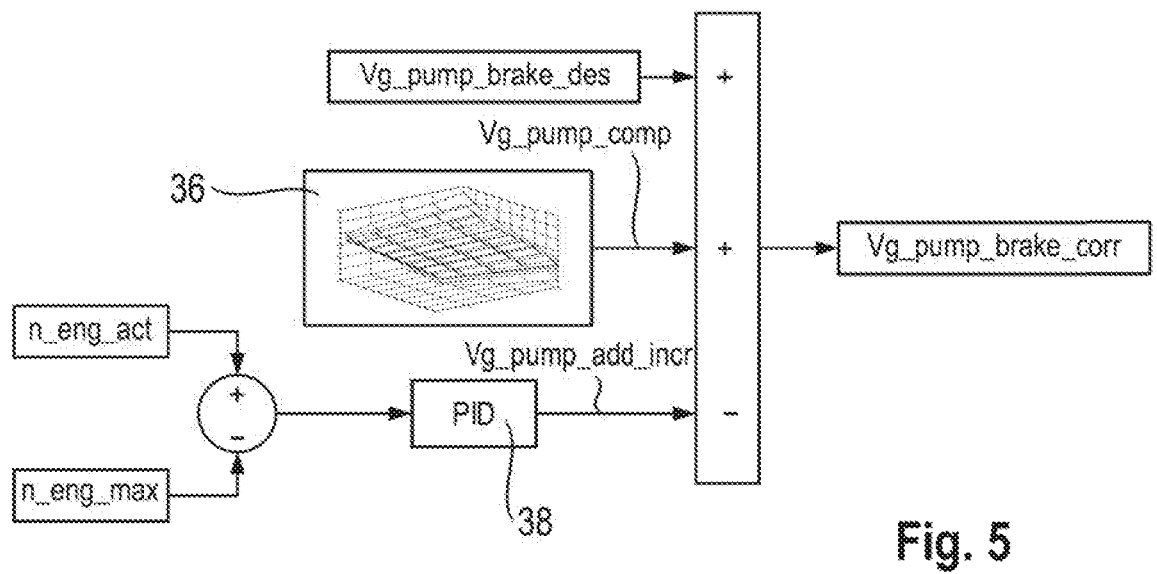
FIG. 5 shows a schematic overview of the characteristic-map-based pilot control with closed-loop control according to the disclosure of the swept volume during the braking operation as per the first exemplary embodiment.

As a result of variance in the manufacture of the primary units 1 and as a result of other factors such as wear and viscosity of the pressure medium used, small deviations of the various physical primary units 1 from the characteristic map 36 are possible, such that, in the first exemplary embodiment, the above-described characteristic-map-based control is utilized as pilot control and is additionally refined as per FIG. 5. In said figure, the characteristic map 36 from FIG. 4 is illustrated in the central region, which characteristic map is used to assign a corresponding corrective value p_st_comp to the setting pressure p_st. A safety corrective value is also incorporated into the characteristic map 36 in order to allow for said possible variance of the characteristic of the various primary units 1 and in order, by means of the pilot control, which is simple in terms of apparatus, by means of the characteristic map 36, to always set a swept volume Vg_pump_comp in the case of which the diesel engine reliably does not overspeed and dissipates a high but non-critical braking power even in the event of a failure of the functions described below.

According to the disclosure, closed-loop control is also superposed on the pilot control, which closed-loop control compares the actual rotational speed n_eng_act of the diesel engine with the maximum admissible rotational speed n_eng_max thereof and generates a further corrective value for the setting pressure p_st. Alternatively, it is also possible for the rotational speed n_pump_act of the primary unit 1 to be compared with a converted maximum admissible rotational speed n_pump_max of the primary unit 1 and for the further corrective value for the setting pressure p_st to be generated.

By means of the pilot control as per the characteristic map 36 (cf. FIGS. 4 and 5), the primary unit 1 is thus already pivoted into the vicinity of the ideal value. According to the prior art, the primary unit 1 however still remains at an altogether somewhat excessively large swept volume Vg_pump (displacement volume), which would lead to a somewhat excessively high rotational speed n_eng_act of the diesel engine. In the case of the excessively small pivot angle angle_pump used according to the disclosure, the braking capability of the diesel engine would be only partially utilized. Thus, although a reliable braking function is duly already basically possible with the described load-sensing primary unit 1, that part of the braking power that flows via the primary unit is however further improved.

The final deviation from the ideal value is ultimately compensated by means of the superposed closed-loop control with the PID closed-loop controller 38 of the first exemplary embodiment, shown in FIG. 4, or with the PI closed-loop controller 138 of the second exemplary embodiment, shown in FIG. 2, which utilizes the "last" actual rotational speed n_eng_act of the diesel engine of its maximum admissible rotational speed n_eng_max as input variable and outputs an increased swept volume Vg_pump_add_incr. Thus, a swept volume Vg_pump_brake_corr that is optimum for the braking operation under the conditions of the physical primary units 1 is determined.

Figure 6:
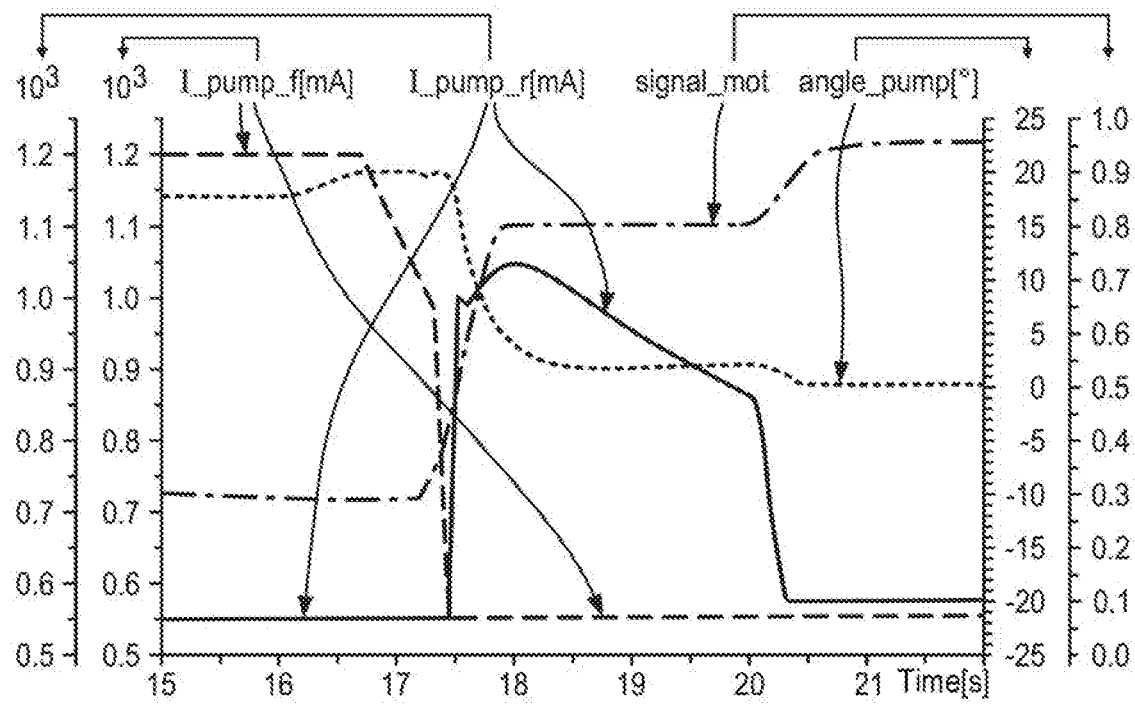
FIG. 6 shows two diagrams of the characteristic-map-based pilot control with closed-loop control according to the disclosure during the braking operation as per the first exemplary embodiment.
Figure 6:
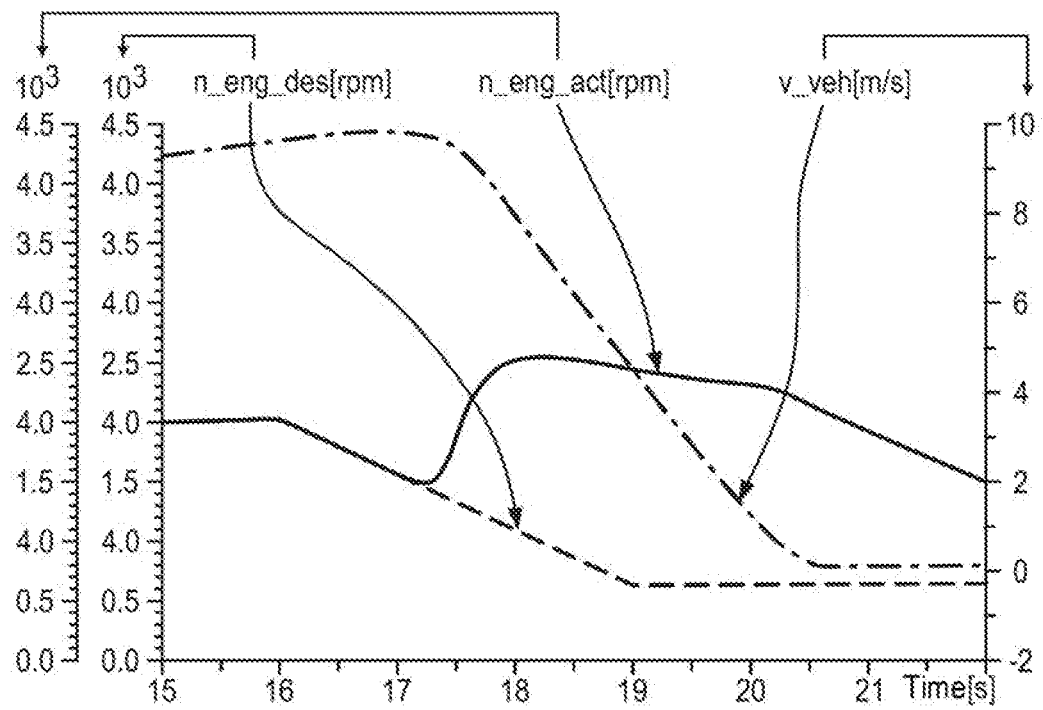

The effect is illustrated by way of example in FIG. 6. Uniform utilization of the diesel engine during the braking operation is realized without the latter reaching the inadmissible rotational speed range.

A hydrostatic transmission is disclosed with which a braking operation can be realized in which at least one traction motor which acts as a pump is supported via a closed circuit on an adjustable axial piston pump which acts as a motor, and which in turn can be supported on an internal combustion engine. Since overspeeding of the latter should be avoided, pilot control is performed with a rotational speed that is subcritical for the internal combustion engine, and thereafter closed-loop control is performed with a closed-loop controller which outputs a corrective value in a manner dependent on the rotational speed deviation between the present rotational speed and the maximum and thus ideal rotational speed of the internal combustion engine. Thus, effective braking with a subcritical rotational speed of the internal combustion engine is ensured at all times even in the event of a failure of the closed-loop controller.

LIST OF REFERENCE DESIGNATIONS

1 Primary unit
2 Secondary unit
4 Driveshaft
6 Rotational speed sensor
8 Control unit
10 Working line
12 Driveshaft
14 Pressure-limiting valve
16 Feed line
18 Feed pump
20 Pressure-limiting valve
22 Check valve
24 Adjustment device
26 Setting cylinder
28 Setting pressure valve
30 Adjustment device
32 Feedback spring
34 Rotational speed sensor
36 Characteristic map
38 Closed-loop controller
138 Closed-loop controller
angle_pump Pivot angle of the primary unit
angle_pump_max Maximum pivot angle of the primary unit
n_eng_act Actual rotational speed of the internal combustion engine
n_eng_max Maximum admissible rotational speed of the internal combustion engine
n_mot_act Actual rotational speed of the secondary unit n_pump_act Actual rotational speed of the primary unit
n_pump_max Rotational speed of the primary unit derived from the maximum rotational speed of the internal combustion engine
p_st Setting pressure of the primary unit
p_st_comp Setting pressure deviation of the primary unit
phasein_mot_ms Duration of the activation of the secondary unit
phasein_mot_delay_ms Delay of the activation of the secondary unit
phasein_pump_ms Duration of the activation of the primary unit
phasein_pump_delay_ms Delay of the activation of the primary unit
phaseout_mot_ms Duration of the deactivation of the secondary unit
phaseout_mot_delay_ms Delay of the deactivation of the secondary unit
phaseout_pump_ms Duration of the deactivation of the primary unit
phaseout_pump_delay_ms Delay of the deactivation of the primary unit
Vg_mot Swept volume of the secondary unit
Vg_pump Swept volume of the primary unit
Vg_pump_add_incr Increased swept volume of the primary unit for braking
Vg_pump_brake Pilot-controlled swept volume of the primary unit for braking
Vg_pump_brake_corr Setpoint swept volume of the primary unit for braking
Vg_pump_comp Swept volume deviation of the primary unit
Vg_pump_max Maximum swept volume of the primary unit
v_veh Traveling speed
Δn_eng Rotational speed difference between the setpoint rotational speed and the actual rotational speed of the internal combustion engine
Δp Pressure difference between the two working lines
T Tank

What is claimed is:

1. A hydrostatic transmission for a traction drive of a mobile working machine, comprising:
a primary unit including a driveshaft configured to couple to an internal combustion engine of a traction drive, the primary unit having one or more of an adjustable pivot angle and an adjustable swept volume, and the internal combustion engine having a predetermined maximum rotational speed;
a secondary unit configured to couple to an output of the traction drive;
two working lines that fluidically connect the primary unit and the secondary unit in a closed circuit;
an electrical control unit configured to set one or more of the adjustable pivot angle and the adjustable swept volume of the primary unit, via pilot-control and during a braking operation of the hydrostatic transmission, to a value such that the internal combustion engine is operated at a rotational speed less than the predetermined maximum rotational speed; and
a closed-loop controller configured to (i) determine a corrective value for one or more of the adjustable pivot angle and the adjustable swept volume, that is configured to cause the internal combustion engine to be operated at the predetermined maximum rotational speed when added to the value set by the electrical control unit, and (ii) output the corrective value;
wherein the electrical control unit is further configured to add the corrective value to the value set for the one or more of the adjustable pivot angle and the adjustable swept volume.

2. The hydrostatic transmission according to claim 1, wherein an input variable of the closed-loop controller is a rotational speed difference between an actual rotational speed of the internal combustion engine, or a variable derived from the former, and the predetermined maximum rotational speed of the internal combustion engine, or another variable derived from the former.

3. The hydrostatic transmission according to claim 2, wherein the electrical control unit is further configured such that the braking operation is initiated by an operating element or based on automatic monitoring of a traveling speed of the mobile working machine or of a variable derived from the former or based on automatic monitoring of the actual rotational speed of the internal combustion engine or of the variable derived from the former.

4. The hydrostatic transmission according to claim 1, further comprising:
a first pressure-limiting valve arranged on a first working line of the two working lines; and
a second pressure-limiting valve arranged on a second working line of the two working lines,
wherein:
during the braking operation, a first part of the braking power is dissipated via one of the first and the second pressure-limiting valves, while a second part of the braking power is dissipated via the primary unit; and
the braking operation is a high power braking operation in which the first part of the braking power is greater than the second part of the braking power.

5. The hydrostatic transmission according to claim 4, wherein the first and second pressure-limiting valves each have a flat characteristic curve with regard to their pressure difference as a function of their passed-through volume flow.

6. The hydrostatic transmission according to claim 1, wherein the pivot angle and the swept volume of the primary unit are adjustable in both directions from a zero position.

7. The hydrostatic transmission according to claim 1, wherein:
the primary unit is a load-sensing axial piston machine;
in a pump operating mode of the load-sensing axial piston machine, forces act in a direction of a decrease of the value of the adjustable pivot angle, the forces dependent on a pressure difference between the two working lines, a rotational speed of the driveshaft, and the value of the adjustable pivot angle, and
electrical control unit includes a characteristic map of the primary unit which has first data assigning a respective pivot angle value or swept volume value to sets of various values of the pressure difference and the rotational speed.

8. The hydrostatic transmission according to claim 7, wherein:
the primary unit includes an adjustment device including an electrical setting pressure valve and a setting cylinder,
the electrical control unit is configured to operate the electrical setting pressure valve and the setting cylinder to control a setting pressure,
the setting pressure acts in a direction of an increase of the value of the adjustable pivot angle of the primary unit, and
the characteristic map further has second data indicative of a dependency-of the setting pressure or of a setting pressure deviation on (i) the values pressure difference of the first and second working lines, (ii) the values rotational speed of the driveshaft, and (iii) the values of the adjustable pivot angle or values of the adjustable swept volume.

9. The hydrostatic transmission according to claim 8, wherein the values of the adjustable pivot angle or adjustable swept volume assigned to the sets of the values of the pressure differences of the two working lines and the rotational speeds of the driveshaft correspond to a range of positions of the primary unit that extends in both directions from a zero position.

10. The hydrostatic transmission according to claim 9, wherein:
   the setting cylinder is double-acting and has two setting pressure chambers, and
   the setting pressure in the two setting pressure chambers is controllable by the electrical control unit by a common or a respective electrically adjustable setting pressure valve.

11. The hydrostatic transmission according to claim 1, wherein the pivot angle and the swept volume of the primary unit are adjustable by an adjustment device, which exhibits feedback of the pivot angle.

12. The hydrostatic transmission according to claim 1, wherein the value for the adjustable pivot angle or adjustable swept volume this is set by the electrical control unit such that the internal combustion engine is operated at the rotational speed less than the predetermined maximum rotational speed is approximately 10% of a maximum pivot angle or swept volume, respectively.

13. A method for the closed-loop control of a braking operation with a hydrostatic transmission for a traction drive of a mobile working machine, comprising:
   setting one or more of a pivot angle and a swept volume of a primary unit, via pilot control, to a value such that an internal combustion engine coupled to a driveshaft of the primary unit is operating at a rotational speed less than a predetermined maximum rotational speed of the internal combustion engine;
   using a closed-loop controller, determining a corrective value configured such that adding the corrective value to the set value for the one or more of the pivot angle and the swept volume of the primary unit causes the internal combustion engine to operate at the predetermined maximum rotational speed; and
   adding the corrective value to the set value, such that the internal combustion engine is operating at the predetermined maximum rotational speed.

14. The method according to claim 13, the corrective value is determined with reference to a rotational speed difference between an actual rotational speed of the internal combustion engine or of a variable derived from the former, and the predetermined maximum rotational speed of the internal combustion engine or a variable derived from the former.

15. The method according to claim 14, further comprising:
   initiating the braking operation in response to (i) a driver demand, (ii) an overshooting of the actual rotational speed of the internal combustion engine or of a variable derived from the former, or (iii) an overshooting of a traveling speed of the mobile working machine or of a variable derived from the former.

16. The method according to claim 13, wherein the pilot control of the pivot angle or of the swept volume is performed based on a characteristic map of the primary unit.

17. The method according to claim 13, wherein the value set for the adjustable pivot angle or adjustable swept volume such that the internal combustion engine is operated at the rotational speed less than the predetermined maximum rotational speed is approximately 10% of a maximum pivot angle or swept volume, respectively.

\* \* \* \* \*